(12) United States Patent
Schendel et al.

(10) Patent No.: US 8,088,236 B2
(45) Date of Patent: Jan. 3, 2012

(54) APPARATUS AND METHOD FOR PRODUCING A LARGE-AREA FIBRE-COMPOSITE STRUCTURAL COMPONENT

(75) Inventors: Joerg Schendel, Stade (DE); Bernd Ostermeier, Hamburg (DE); Thomas Konsolke, Hamburg (DE); Ralf-Peter Dittmann, Rotenburg (DE)

(73) Assignee: AIRBUS Deutschland GmbH, Munich (DE)

( * ) Notice: Subject to any disclaimer, the term of this patent is extended or adjusted under 35 U.S.C. 154(b) by 168 days.

(21) Appl. No.: 12/227,028

(22) PCT Filed: May 4, 2007

(86) PCT No.: PCT/EP2007/054337
§ 371 (c)(1),
(2), (4) Date: Jun. 30, 2009

(87) PCT Pub. No.: WO2007/128788
PCT Pub. Date: Nov. 15, 2007

(65) Prior Publication Data
US 2010/0006202 A1 Jan. 14, 2010

(30) Foreign Application Priority Data
May 5, 2006 (DE) .......................... 10 2006 021 110

(51) Int. Cl.
*B32B 37/00* (2006.01)
*B65H 81/00* (2006.01)
(52) U.S. Cl. .......... 156/64; 156/361; 156/574; 156/577
(58) Field of Classification Search ............. 156/64, 156/350, 351, 352, 361, 574, 577
See application file for complete search history.

(56) References Cited

U.S. PATENT DOCUMENTS

| | | | | |
|---|---|---|---|---|
| 3,574,040 A | * | 4/1971 | Chitwood et al. | 156/522 |
| 3,810,805 A | * | 5/1974 | Goldsworthy et al. | 156/361 |
| 4,541,886 A | * | 9/1985 | Marlow et al. | 156/230 |
| 4,588,466 A | * | 5/1986 | Eaton | 156/235 |
| 4,849,062 A | * | 7/1989 | Jennet et al. | 156/364 |
| 4,883,624 A | | 11/1989 | Spaay | |
| 6,666,122 B2 | * | 12/2003 | Raney et al. | 83/451 |
| 7,137,182 B2 | * | 11/2006 | Nelson | 29/428 |
| 7,601,237 B2 | * | 10/2009 | Burgess et al. | 156/265 |
| 7,611,601 B2 | * | 11/2009 | Nelson et al. | 156/265 |
| 2004/0069413 A1 | * | 4/2004 | Nelson | 156/538 |
| 2005/0056965 A1 | | 3/2005 | Hawkins | |

FOREIGN PATENT DOCUMENTS

| | | |
|---|---|---|
| EP | 0 062 991 B1 | 10/1982 |
| FR | 2548084 A1 | 1/1985 |
| GB | 2 268 705 A | 1/1994 |
| SU | 1801091 A3 | 3/1993 |

OTHER PUBLICATIONS

Kothe, Rainer. "Flugzeugbau mit Nadel und Faden und neuen Werkstoffen," *Innovate High-Tech-Kunst.* p. 24-29.

* cited by examiner

*Primary Examiner* — Jeff Aftergut
(74) *Attorney, Agent, or Firm* — Maginot, Moore & Beck (57) ABSTRACT

The present invention provides an apparatus and a method for producing a large-area fibre-composite structural component, in particular for the aircraft sector, comprising a predetermined shaping element, a controllable laying device for the defined laying of at least one fibrous sheet over or into the predetermined shaping element, a controllable turning device for a defined turning of the predetermined shaping element and of the laying device in relation to each other by a predetermined turning angle, and a central control device, which is connected to the laying device and the turning device for controlling of the same.

19 Claims, 6 Drawing Sheets

APPARATUS AND METHOD FOR PRODUCING A LARGE-AREA FIBRE-COMPOSITE STRUCTURAL COMPONENT

FIELD OF INVENTION

The present invention relates to an apparatus and a method for producing a large-area fibre-composite structural component, in particular for the aircraft sector.

BACKGROUND OF THE INVENTION

Although it can be applied to any desired large-area fibre-composite structural components, the present invention and the problem on which it is based are explained in more detail with reference to the rear pressure dome, i.e. the dome of the rear pressure bulkhead, of an aircraft.

In the production of structural components in the aircraft sector, on the one hand certain weight specifications have to be observed, but on the other hand the production of such structural components must also be economical. In the aerospace industry, composite materials are increasingly replacing metal materials, since they are much lighter than metal materials. Every kilogram of weight that is saved advantageously reduces fuel costs or increases the payload.

For example, lightweight carbon-fibre reinforced plastics (CRP) are used for the production of wing trusses, landing flaps, rear fuselage sections with horizontal and vertical tail empennages and the aforementioned pressure dome. For economic reasons, airliners fly at altitudes of about 10 to 15 km. To be able to survive at these altitudes, a pressurized cabin is required. In this, a pressure that corresponds to a flying height of approximately 3 km is maintained. The pressure dome forms the rear end part for this pressurized cabin. During the flight, it bears the entire internal cabin pressure. Together with a ring of titanium, for example, and numerous angles for introducing force into the fuselage structure, the dome is mounted in a clamped manner on the assigned ring in front of the vertical empennage.

For components of a large area and little curvature, such as for example the empennage panels, at present resin-impregnated carbon fibre strips (known as prepregs) are used. These are laboriously brought into the later shape and cured by means of pressure and heat in what is known as an autoclave.

However, the methods so far known to the applicant for the manual laying of the prepreg strips are mainly suitable for geometries that are simple and have little curvature. In the case of more complex geometries to be laid, the laying rate is reduced to a value that is no longer economical. Furthermore, the pre-impregnated prepreg strips are relatively expensive and can only be stored under certain conditions.

For structures that have a greater curvature or are more complex, the applicant has developed a novel production concept, which is mentioned in the trade journal HIGH PERFORMANCE, Composites May 2003, page 45 et seq.; the trade journal Forum, July 2004, page 8 et seq. and in the trade journal Innovate!, "Flugzeugbau mit Nadel und Faden und neuen Werkstoffen" [aircraft construction with needle and thread and new materials), page 24 et seq. Resin-free carbon fibre fabrics are accordingly brought into the desired shape in the dry state, the resin only being subsequently worked into the fabric. Resin-free carbon fibre fabrics can be handled much more easily than sticky prepreg strips. Individual, multi-axial carbon-fibre nonwoven fabrics are sewn together by means of an automated sewing method to form a so-called nonwoven carpet. In this nonwoven carpet, the carbon fibres are arranged in the longitudinal and transverse directions. The individual multi-axial carbon-fibre nonwoven fabrics or semifinished fibrous sheets are therefore joined together, for example by sewing, to form large-area, planar nonwoven carpets, rolled up on rolls and unrolled over a shaping element.

When using previous laying techniques and installations for laying the sewn carpets made up of individual multi-axial nonwoven sheets, one problem would be that undesired folds or waves would form, in particular in the edge regions, when the nonwoven carpets are laid on highly curved shaping elements. The formation of such folds makes it considerably more difficult to place the finished structural components against assigned mounting parts during final assembly.

SUMMARY OF THE INVENTION

It is ONR object of the present invention to provide an apparatus and a method of the type mentioned at the beginning that prevent the occurrence of draping during the laying of the nonwoven carpets and ensure the production of a wave-free structural component.

The invention provides an apparatus with the features of Patent Claim 1 and a method with the features of Patent Claim 14.

One idea on which the present invention is based is that manual laying of the fibrous sheets or nonwoven carpets is replaced by an automated unrolling method by means of a corresponding apparatus controlled by a central control device. In this case, a predetermined shaping element is provided, a fibrous sheet is laid in a defined manner over or into the predetermined shaping element by means of a controllable laying device; the predetermined shaping element and the laying device are turned by means of a controllable turning device in relation to each other by a predetermined turning angle; and a further fibrous sheet is laid in a defined manner on top of the already laid fibrous sheet by means of the controllable laying device.

Consequently, a number of fibrous sheets or nonwoven carpets can be laid in an automated and defined manner one on top of the other with predetermined directions of orientation in such a way that the formation of folds or waves, in particular in the edge region of the structural component, is advantageously prevented on account of the exact controlling of the laying operation. Consequently, structural components with any imaginable geometry, in particular also with highly curved surfaces, can be produced by the novel laying method and the novel apparatus. Moreover, on account of the automated laying, the laying rate is advantageously increased and the times when the apparatus is busy are reduced.

Advantageous refinements and improvements of the apparatus specified in Patent Claim 1 and of the method specified in Patent Claim 14 can be found in the subclaims.

According to a preferred development, the predetermined shaping element has the form of the structural component to be produced, for example in the case of a pressure dome to be produced the form of a turned-out shallow dish with an oval or circular cross section. The shaping element serves for the laying of the corresponding resin layer and the individual fibrous sheet and predefines the form of the structural component to be produced. The automated laying method and the controllable laying device also allow quite highly curved shaping elements to be covered with the corresponding fibrous sheets economically and without the formation of folds.

According to a further preferred development, the laying device has four lifting columns, which are arranged in pairs around the shaping element and can be synchronously controlled by the central control device. Each pair of lifting columns is preferably respectively assigned a vertically adjustable cross member, which respectively comprise two receiving carriages that can be displaced synchronously along the respective cross member and are intended for receiving predetermined fibrous sheet rolls. The receiving carriages on the one hand and the cross members on the other hand are adjusted transversely and vertically by the central control device in such a way that automated and defined guiding of the fibrous sheet rolls over the shaping element is accomplished, and consequently defined laying of the fibrous sheet on the shaping element. The central control device activates the lifting columns for a synchronous vertical adjustment of the assigned cross members along the lifting columns and the receiving carriages for a synchronous transverse adjustment of the receiving carriages, and consequently the fibrous sheet rolls, along the cross members suitably in a predetermined way.

Advantageously, two fibrous sheet rolls are guided uniformly and synchronously from the centre of the predetermined shaping element to the edge of the same by means of the laying device controlled by the central control device, for uniform laying of the fibrous sheet over or into the predetermined shaping element above the same. For this purpose, synchronous controlling of the receiving carriages and of the lifting columns is performed by the central control device.

Preferably a number of fibrous sheets, for example six, are laid one on top of the other over or into the predetermined shaping element, the central control device instigating that, after each laying of a fibrous sheet, the predetermined shaping element is turned by means of the turning device by a predetermined turning angle, for example 30°, in relation to the laying device and is arrested. Consequently, a predetermined rolling rate, a predetermined advancing rate and/or a predetermined advancing amount of the fibrous sheet to be laid can be advantageously controlled by the central control device during the laying of the said sheet over or into the shaping element.

According to a further preferred exemplary embodiment, in the event of a failure of the automatic controlling by means of the central control device, the laying device is operated in emergency mode for manual laying of the fibrous sheet. Consequently, a laying operation that has been commenced can be manually completed, in order to prevent loss of the component.

BRIEF DESCRIPTION OF THE DRAWINGS

The invention is explained in more detail below on the basis of exemplary embodiments with reference to the accompanying figures of the drawing, in which.

Unless otherwise specified, in the figures the same reference numerals designate components that are the same or functionally the same.

DETAILED DESCRIPTION OF THE INVENTION

Figure 1:
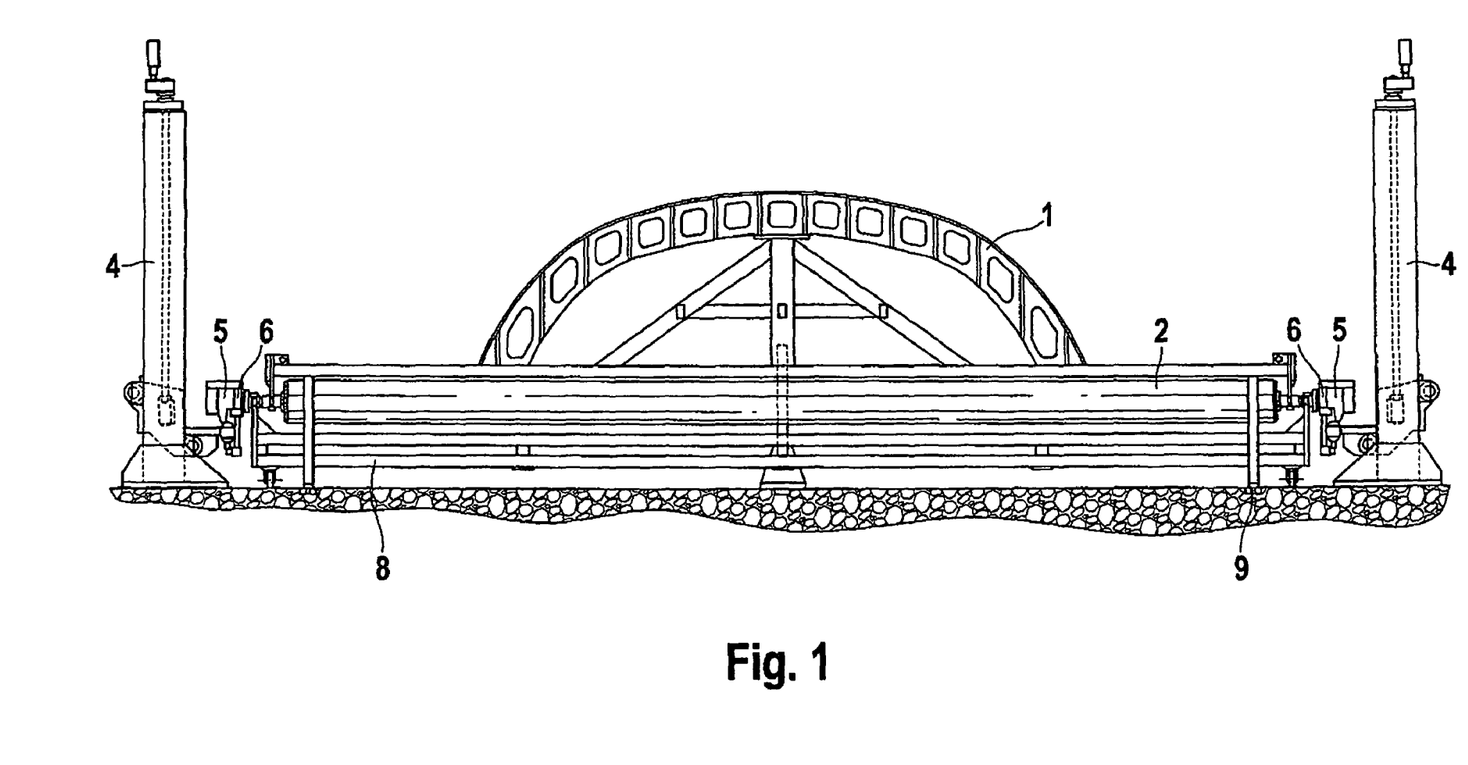
FIG. 1 shows a front view of an apparatus according to a preferred exemplary embodiment of the present invention in a roll receiving state.
Figure 2:
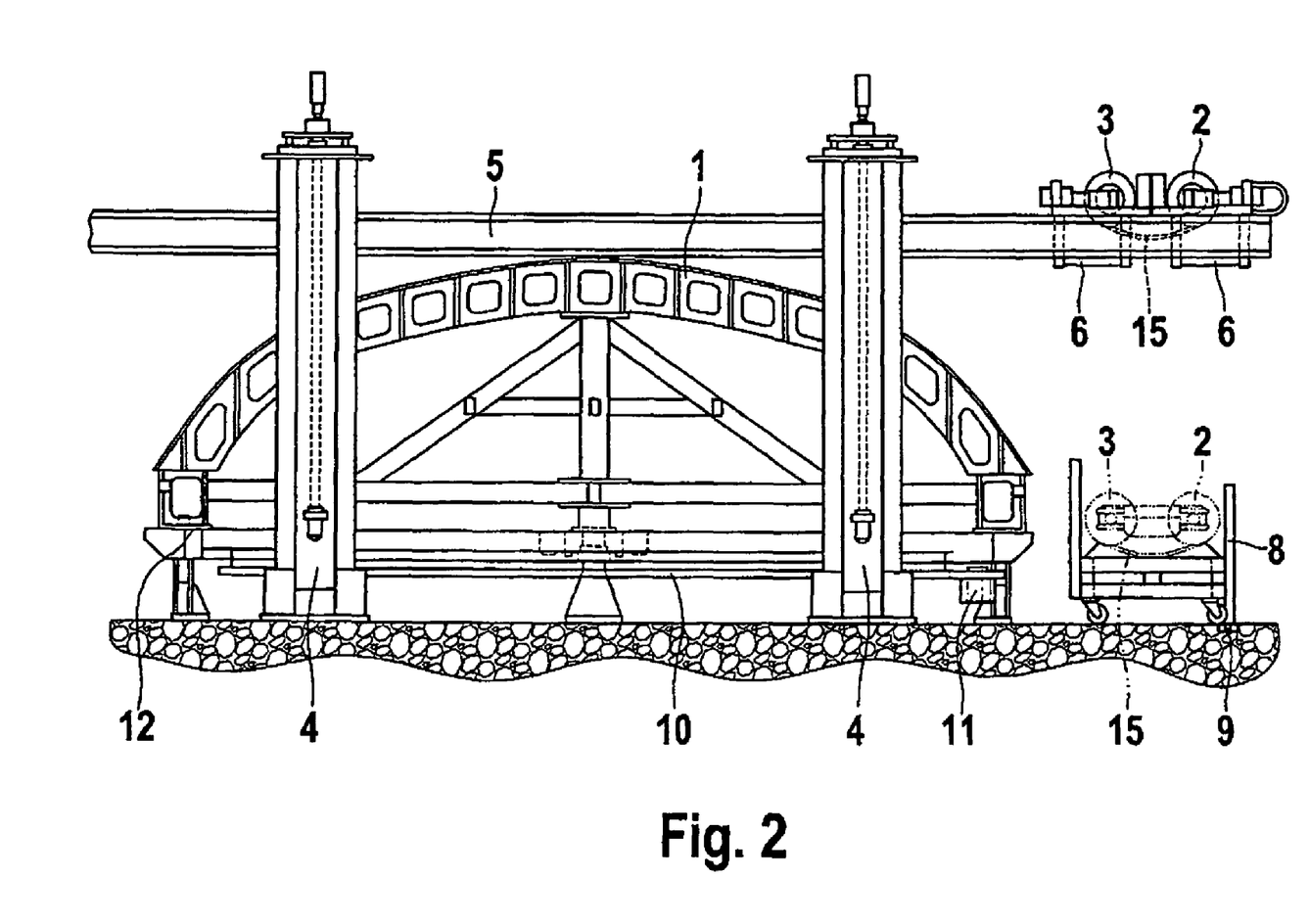
FIG. 2 shows a left-side view of the apparatus from FIG. 1, given by way of example, in a first roll moving state.
Figure 3:
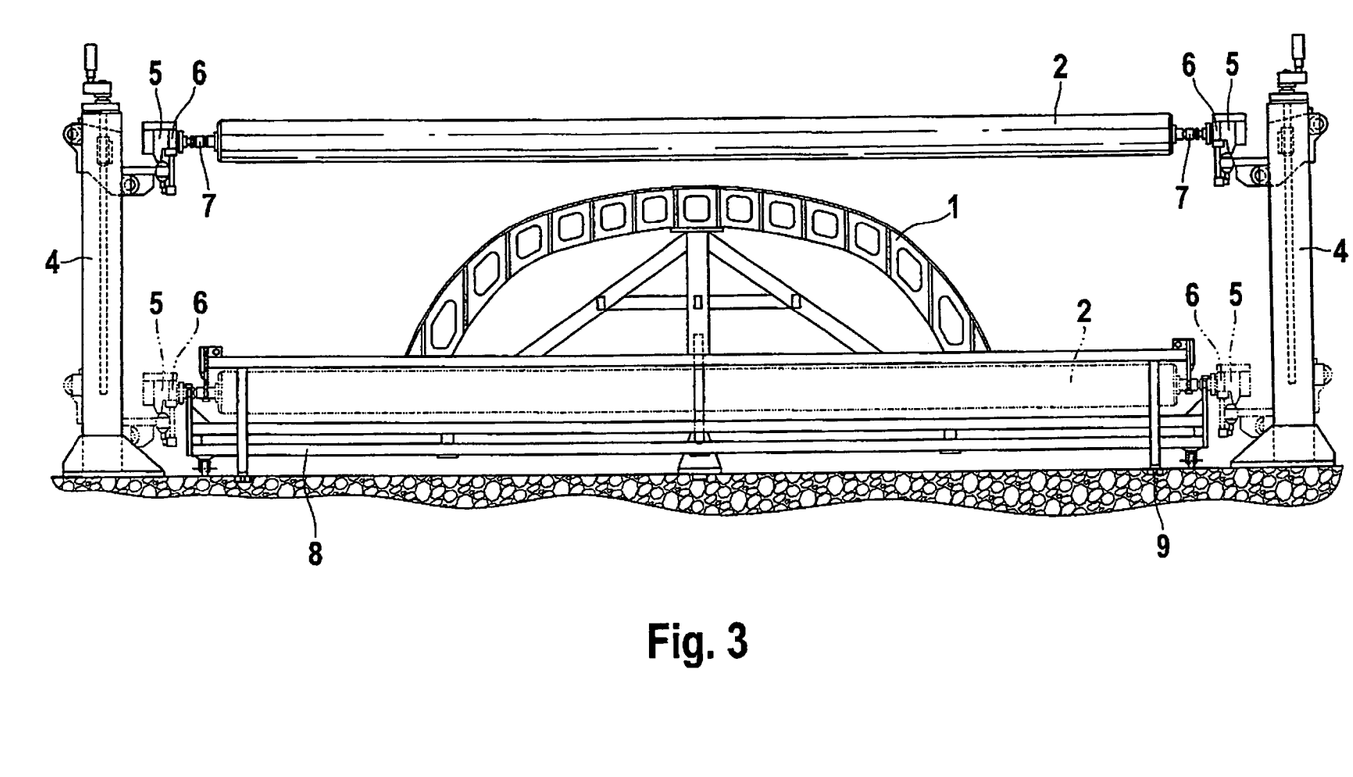
FIG. 3 shows a front view of the apparatus from FIGS. 1 and 2, given by way of example, in the roll receiving state and in the first roll moving state.
Figure 4:
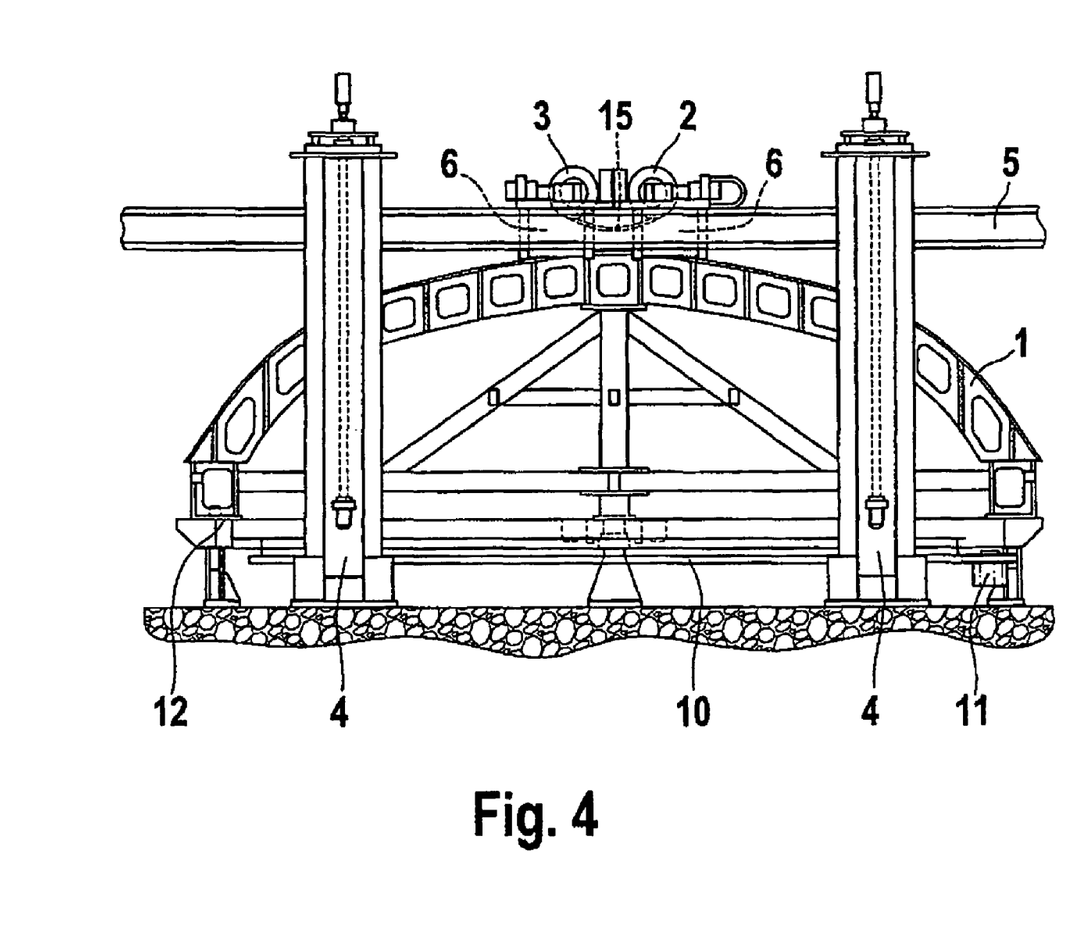
FIG. 4 shows a left-side view of the apparatus from FIGS. 1 to 3, given by way of example, in a second roll moving state.
Figure 5:
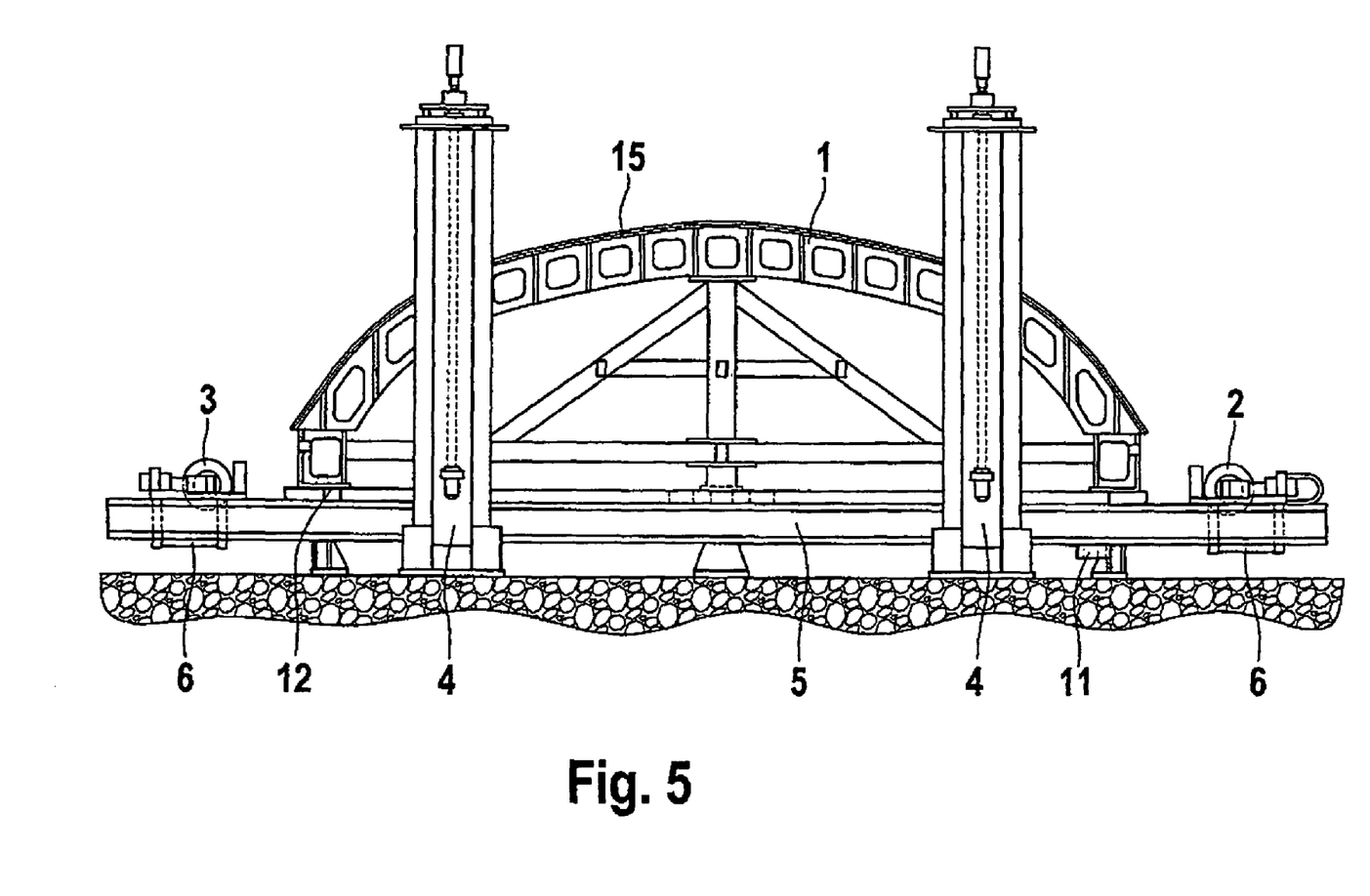
FIG. 5 shows a left-side view of the apparatus from FIGS. 1 to 4, given by way of example, in a third roll moving state.

In FIGS. 1 to 5, an apparatus for producing a structural component from a fibre-composite material, for example a carbon-fibre reinforced plastic (CRP), according to a preferred exemplary embodiment of the present invention is represented. In this case, FIGS. 1 and 3 illustrate a front-side view and FIGS. 2, 4 and 5 illustrate a left-side view of the apparatus in different moving states.

The apparatus given by way of example preferably has a shaping element 1, which is formed for example as a positive adhesive-bonding device of structural steel or the like. The dimensions of the shaping element 1 are adapted to the desired dimensions of the structural component to be produced, for example the pressure dome to be produced. Any different coefficients of thermal expansion of the moulding material in comparison with the material of the component are preferably already suitably compensated in the structural design of the shaping element 1.

For the production of a pressure dome for an aircraft, the shaping element 1 is advantageously formed as a turned-out, shallow dish. Depending on the type of aircraft, the shaping element 1 may have, for example, an oval or circular cross-sectional form.

Preferably, prepreg doublers and/or edge reinforcing layers are first applied to predetermined locations on the surface of the shaping element 1, for example to reinforce cutouts or the like that are later to be provided in the pressure dome. Segment doublers and edge reinforcing layers comprise prepreg blanks and are supplied for example by means of an ultrasonic cutter and positioned at the corresponding locations of the shaping element. Subsequently, a suitable resin film is correspondingly cut to size by means of templates and laid over the entire shaping element 1.

Individual nonwoven sheets of preferably a carbon-fibre reinforced plastic are joined together by a suitable joining method, for example sewing, tacking, knitting, adhesive bonding or the like, to form a large-area nonwoven carpet 15. By skilful thread guidance, it is possible for example in a sewing process for each location of a component to be adapted to the greatest extent to the loads that will later occur at this location. The nonwoven sheets are preferably joined together without previously being enveloped in synthetic resin. Resin-free carbon fibre fabrics can be handled more easily than sticky prepregs.

By such a joining method, a large nonwoven carpet 15 is produced in advance, for example from carbon fibre material in which the carbon fibres are preferably arranged in the longitudinal and transverse directions. In order to achieve a structurally adapted strength of the carbon material, later a number of these nonwoven carpets 15, preferably six, are laid one on top of the other in different directions, which is explained in more detail further below.

The nonwoven carpets 15 are advantageously already in each case prefabricated to the form of the structural component to be produced, in order to minimize as much as possible the scrap produced. The sewn-together nonwoven carpets 15 to be laid are in each case wound up uniformly and symmetrically onto a roll system comprising preferably two nonwoven rolls, so that in the wound-up state the axis of symmetry of the nonwoven carpet 15 is preferably arranged between the two nonwoven rolls. The nonwoven rolls are provided in the figures with the reference numerals 2 and 3.

Subsequently, the nonwoven carpets 15 rolled up on the nonwoven rolls are laid by means of an apparatus onto the assigned shaping element 1, which is explained in more detail below with reference to the figures.

As is further evident from FIGS. 1 to 5, apart from the shaping element 1, the apparatus also has a laying device, which comprises a lifting column system surrounding the shaping element 1 and preferably comprising four lifting columns 4. On both sides of the shaping element 1, two lifting columns 4 for example are provided for respectively forming a pair of lifting columns, as represented in particular in FIG. 2. The two pairs of lifting columns are preferably arranged symmetrically in relation to each other and have in each case an assigned cross member 5.

Integrated in each cross member 5 are, for example, two synchronously, electromotively driven receiving carriages 6, which are displacably mounted so as to slide in the transverse direction along the assigned cross member 5 by means of controlling by a central control device. The cross members 5 are in turn preferably vertically adjustable by the lifting columns 4, which can be synchronously controlled by the central control device, so that the receiving carriages 6 can be synchronously adjusted both in the transverse direction and in the vertical direction by appropriate controllings.

The nonwoven rolls 2, 3 are preferably provided in the rolled-up state in a suitable transporting car 8, which is positioned by means of suitable positioning means 9 in relation to the receiving carriages 6, as is evident for example in FIGS. 1 to 3.

According to the present exemplary embodiment, as is evident from FIG. 1, the nonwoven rolls 2, 3 are received in a defined transfer position directly from a transporting car 8 and made to move from the receiving position represented in FIG. 1 into the position represented in FIG. 2. For this purpose, the lifting columns 4 are controlled by means of the central control device in such a way that the assigned cross members are adjusted to a predetermined height after receiving the rolls.

Subsequently, the receiving carriages 6, which in each case have for example electromotive drives which are connected to the central control device for controlling of the same, are made to move by appropriate controlling from the position represented in FIG. 2 along the cross members 5 into the initial laying position according to FIG. 4. In this initial laying position, the laying rolls 2, 3 are preferably over the centre of the shaping element 1. Exact positioning of the nonwoven rolls 2, 3 or the nonwoven carpet 15 to be laid with respect to the shaping element is accomplished for example by means of applied markings and/or an additional positioning device, for example an optical positioning device.

The overall sequence of movements of the nonwoven rolls 2, 3 is made up of the vertical adjustment of the cross members 5 and the transverse adjustment of the receiving carriages 6, the overall laying operation and nonwoven roll guiding operation being accomplished under program control by the central control device. The lifting columns 4 and the receiving carriages 6 are preferably controlled in a synchronous and defined manner by the central control device in such a way that the nonwoven carpet 15 rolled up on the nonwoven rolls 2, 3 is laid in an automated manner at a predetermined, defined rolling rate, advancing rate and/or advancing amount onto the shaping body 1.

Starting from the state represented in FIG. 4, for example, the two nonwoven rolls 2, 3 are brought uniformly from the centre of the shaping element 1 to the edge of the same, as schematically represented by the states of the nonwoven rolls 2, 3 in FIGS. 4 and 5.

In order to avoid displacement of nonwoven carpets that have already been applied, the nonwoven rolls 2, 3 are preferably guided in a self-supporting manner approximately 50 mm above the shaping element 1. Here, the roll drives of the nonwoven rolls 2, 3 advantageously do not exert any additional forces on the nonwoven carpet 15. Suitable centring pins 7 at the ends of the nonwoven rolls 2, 3 serve to ensure that they are exactly received on the assigned receiving carriages 6 and that the nonwoven rolls 2, 3 are exactly guided over the shaping element 1.

Such defined, automatic unrolling of the nonwoven carpet 15 to be laid onto the shaping element 1 allows a high laying rate and fold-free or wave-free laying to be achieved, even in the edge regions. This automated laying operation also ensures a reproducible laying process, so that even structural components with highly curved surfaces are accomplished without the formation of folds, for good attachment to assigned mounting parts.

The apparatus according to the present preferred exemplary embodiment also has, furthermore, a turntable 10, on which the shaping element 1 is mounted. The turntable 10 is preferably likewise connected to the central control device for turning control of the same. Such a turning movement is preferably accomplished by means of an electromotive drive 11, which can be controlled by the central control device in a way known per se. The turntable 10 also has, for example, a positioning device 12, which serves for exactly positioning the turntable 10 by the prescribed turning angle. Suitable controlling accordingly allows the turntable 10 to move the shaping element 1 into any turned position.

Preferably, after laying a nonwoven carpet 15 onto the shaping element 1 according to the method described above, the shaping element 1 is turned on the turntable 10 by means of the controlled electromotive drive 11, by for example 30°, in relation to the lifting column system and is suitably fixed.

Subsequently, a further nonwoven carpet 15 is laid on top of the previously applied nonwoven carpet or carpets 15 in the manner described above.

This operation can be repeated several times in succession in a suitable way. In order to achieve a structurally adapted strength of the fibre material, for example six nonwoven carpets 15 of this kind are laid one on top of the other, turned by 30° in different directions. It is obvious to a person skilled in the art that a number of nonwoven carpets 15 other than six may be laid one on top of the other, the turning angle of the turning device preferably being adapted correspondingly to the number of nonwoven carpets 15 to be laid.

After applying all the nonwoven carpets 15 to the shaping element 1, prepreg reinforcements such as those initially applied are in turn applied, preferably symmetrically in relation to the latter, in the predetermined regions of the shaping element 1.

Finally, the shaping element 1 together with the laid nonwoven carpets 15 and reinforcements and/or applied stiffeners are introduced into a suitable baking oven, known as an autoclave. There, the synthetic resin, for example epoxy resin, laid as films, is pressed between the individual nonwoven carpets 15 by a vacuum and is cured. In this way, the desired structural component, for example a pressure dome for an aircraft, is obtained after removal from the shaping element 1.

On account of the high degree of automation, the method described above and the apparatus described are extremely economical and very reliable. Suitable guidance control of the nonwoven rolls advantageously allows damage to the fibres of the nonwoven carpets 15 to be avoided during the laying operation.

The apparatus additionally has for example a positioning device, which is formed for example as a linear laser projector. This positioning device serves in particular for positioning the prepreg reinforcements to be laid on the shaping element 1, or stiffeners to be additionally applied, in conjunction with the defined turntable position.

All component parts of the installation that come into contact with or reach over the nonwoven carpet 15 are advantageously designed in such a way as to preclude soiling of the nonwoven carpet 15 and any not fully cured stiffeners, for example by fluff, abrasive matter, oil or colour particles. This applies in particular to all component parts of the laying device 4, 5, 6 and of the podium described further below that do not contain any lubricants such as oils, greases or silicone-containing lubricating and sliding substances. All drive devices of the turntable 10 and of the entire laying device 4, 5, 6 are also preferably guarded with sheet metal covers to prevent operating personnel reaching in. Moreover, these covers guard the nonwoven carpets 15 against the escape of any operating fluids or materials that may be present.

The apparatus explained in more detail above normally operates in automatic mode, in which the central control device controls the guidance of the nonwoven rolls for laying the nonwoven carpets 15 onto the shaping element 1. In the event of failure of the automatic control or of certain drive devices, an emergency mode is preferably provided, a mode in which a laying operation that has been commenced can be manually completed, in order to prevent loss of the structural component. In order to avoid or eliminate risks for the operating personnel and damage in the apparatus, an emergency-off device is preferably installed in compliance with safety regulations.

Figure 6:
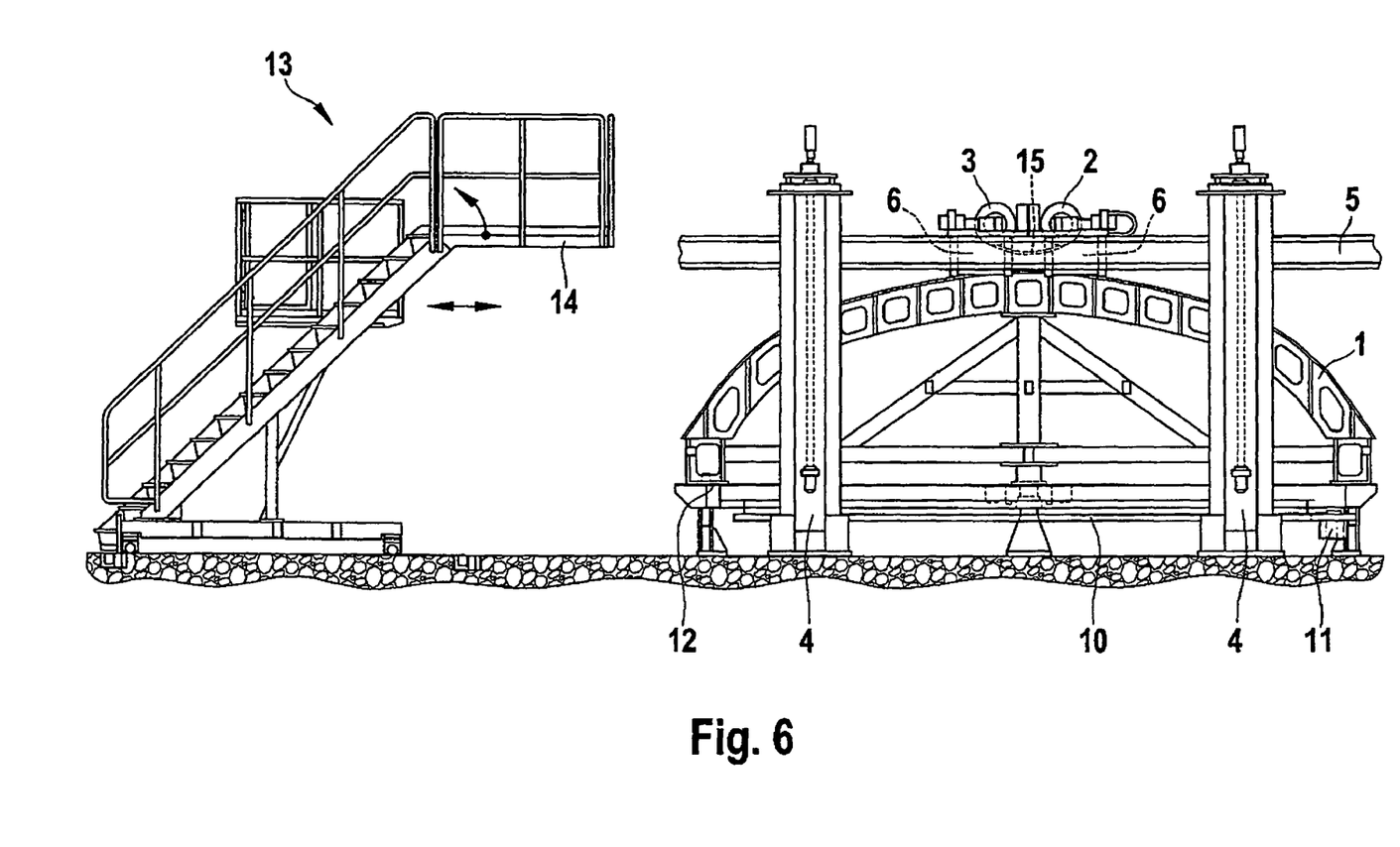
FIG. 6 shows a left-side view of an apparatus according to a further preferred exemplary embodiment of the present invention.

FIG. 6 schematically illustrates a left-side view of an apparatus for producing a large-area fibre-composite structural component according to a further preferred exemplary embodiment of the present invention. As is evident in FIG. 6, in addition to the component parts described above, the apparatus has a movable podium 13, which is formed for example as a staircase landing with foldable platforms 14. In FIG. 6, possible adjusting and folding movements are schematically represented by the indicated arrows. However, it is obvious to a person skilled in the art that further refinements of the podium 13 are possible.

For example, the podium 13 is rail-guided, to allow the tilting moment in a working position to be absorbed, the rail system advantageously being sunk in the floor of the factory to avoid edges that could be tripped over. The podium 13 may for example be made to move manually or electronically by means of an assigned control device and be arrested in the respective servicing and/or working position. As a result, the shaping element 1 can be reached by the operating personnel at any time and at any location.

Although the present invention has been described here on the basis of preferred exemplary embodiments, it is not restricted to these but can be modified in a wide variety of ways.

For example, the laying device may also comprise a square frame which is mounted by means of a number of rollers on a ring rail. The ring rail is provided for example with a number of bores, in order to fix the frame in the respectively desired angle of orientation by stop pins. The shaping element is fixedly mounted in the middle of the ring rail, which is for example bolted to the floor, so that a relative turning of the frame in relation to the shaping element is accomplished by turning the square frame along the ring rail.

Preferably fastened on the rotatably mounted, square frame are two arcuate running rails, on each of which two controllable carriages are adjustably mounted. Rotatably mounted on each carriage is one end of the nonwoven rolls. By suitable controlling of the carriages, the latter are synchronously guided along the arcuate running rails, so that the nonwoven rolls roll out, for example from the centre of the shaping element over the shaping element to the edge of the same. The form of the arcuate running rails is to be adapted here to the form of the shaping element or the form of the structural component to be produced.

What is claimed is:

1. Method for producing a large-area fibre-composite structural component, in particular for the aircraft sector, comprising:
providing of a predetermined shaping element;
advance rolling up of a fibrous sheet to be laid on two fibrous sheet rolls, which are received by means of a controllable laying device;
defined laying of the fibrous sheet over or onto the predetermined shaping element by adjusting the two fibrous sheet rolls both in the vertical direction and in the transverse direction by means of the controllable laying device having four synchronously controllable lifting columns which are arranged in pairs around the shaping element for adjusting the fibrous sheet rolls in the vertical direction, each pair of lifting columns being respectively assigned a vertically adjustable cross member, wherein in each cross member there are respectively integrated two receiving carriages for receiving the fibrous sheet rolls that can be displaced synchronously along the respective cross member for adjusting the fibrous sheet rolls in the transverse direction, and guiding the two fibrous sheet rolls uniformly and synchronously from the centre of the predetermined shaping element to the edge of the same by means of the controllable laying device;
turning of the predetermined shaping element and the controllable laying device in relation to each other by a predetermined turning angle by means of a controllable turning device; and
defined laying of a further fibrous sheet on top of the already laid fibrous sheet by means of the controllable laying device.

2. Method according to claim 1, wherein the laying device and the turning device are controlled by a central control device.

3. Method according to claim 1, wherein a number of fibrous sheets, for example six, are laid one on top of the other over or onto the predetermined shaping element, after each laying of a fibrous sheet the predetermined shaping element being turned by means of the turning device by a predetermined turning angle in relation to the laying device and arrested.

4. Method according to claim 1, wherein the two fibrous sheet rolls are guided in a self-supporting manner approximately 50 mm above the predetermined shaping element.

5. Method according to claim 1, wherein a predetermined unrolling rate, a predetermined advancing rate and/or a predetermined advancing amount of the fibrous sheet to be laid are controlled by the central control device during the laying of the same over or onto the shaping element.

6. Method according to claim 1, wherein, in the event of failure of the automatic control by means of the central control device, the laying device is operated in an emergency mode for manual laying of the fibrous sheet.

7. Apparatus for producing a large-area fibre-composite structural component, in particular for the aircraft sector, comprising:
- a predetermined shaping element;
- a controllable laying device for the defined laying of at least one fibrous sheet over or onto the predetermined shaping element, the laying device having four synchronously controllable lifting columns, which are arranged in pairs around the shaping element, each pair of lifting columns being respectively assigned a vertically adjustable cross member, wherein in each cross member there are respectively integrated two receiving carriages for receiving predetermined fibrous sheet rolls that can be displaced synchronously along the respective cross member;
- a controllable turning device for a defined turning of the predetermined shaping element and of the laying device in relation to each other by a predetermined turning angle; and
- a central control device, which is connected to the laying device and the turning device for controlling of the same.

8. Apparatus according to claim 7, wherein the predetermined shaping element has approximately the form of a turned-out, shallow dish.

9. Apparatus according to claim 7, wherein the predetermined shaping element has an oval or circular cross section.

10. Apparatus according to claim 7, wherein the predetermined shaping element is formed suitably for the forming of a pressure dome of an aircraft.

11. Apparatus according to claim 7, wherein the receiving carriages have an electronic drive device each that can be controlled by the central control device synchronously with the other receiving carriages.

12. Apparatus according to claim 7, wherein the central control device is connected to the lifting columns for a synchronous vertical adjustment of the assigned cross members along the longitudinal direction of the lifting columns and to the receiving carriages for a synchronous transverse adjustment of the receiving carriages along the cross members.

13. Apparatus according to claim 7, wherein the laying device has a transfer device for receiving the fibrous sheet, rolled up on two fibrous sheet rolls, from a transporting car in a defined transfer position.

14. Apparatus according to claim 7, wherein the turning device has a controllable turntable for receiving and positioning the predetermined shaping element in relation to the laying device.

15. Apparatus according to claim 14, wherein the turntable has an electronic drive device that can be controlled by the central control device.

16. Apparatus according to claim 7, wherein the apparatus has an adjustable podium for access to any region of the shaping element by a member of the operating personnel.

17. Apparatus according to claim 16, wherein the podium is adjustable along a rail system and has at least one pivotable platform.

18. Apparatus according to claim 7, wherein the apparatus has a positioning device, for example a marking device, a linear laser projector system or the like, for positioning the fibrous sheet to be laid and/or any additional reinforcing means in conjunction with the defined position of the turning device.

19. Apparatus according to claim 7, wherein the apparatus has in the event of failure of the automatic control by means of the central control device an emergency operating device for a manual emergency mode to perform the defined laying of the fibrous sheet.

* * * * *